United States Patent [19]
Hutchison

[11] 4,301,325
[45] Nov. 17, 1981

[54] SEALING CONDUITS

[75] Inventor: John B. Hutchison, Kingsley, England

[73] Assignee: BICC Limited, London, England

[21] Appl. No.: 103,628

[22] Filed: Dec. 14, 1979

[30] Foreign Application Priority Data

Dec. 21, 1978 [GB] United Kingdom ............... 49729/78
Aug. 29, 1979 [GB] United Kingdom ................. 7929881

[51] Int. Cl.³ ...................... H02G 3/06; H02G 15/04; H02G 1/14
[52] U.S. Cl. ........................................ 174/76; 29/460; 29/878; 29/883; 29/884; 156/242; 156/245; 156/293; 156/295; 156/330; 174/65 SS; 174/77 R; 206/219; 206/568
[58] Field of Search ............... 264/261, 272, 262, 263, 264/248, 267, 320, 323; 174/76, 77 R, 65 SS; 156/293–295, 242, 330, 245; 206/219, 568; 29/460, 527.2, 527.3, 527.4, 878, 883, 884

[56] References Cited

U.S. PATENT DOCUMENTS

| | | | |
|---|---|---|---|
| 2,522,572 | 9/1950 | Fengler et al. | 29/883 |
| 2,827,509 | 3/1958 | Wayman | 174/65 SS |
| 3,151,209 | 9/1964 | D'Ascoli et al. | 174/77 R |
| 3,660,887 | 5/1972 | Davis | 29/460 |
| 3,668,779 | 6/1972 | Turner | 29/883 |
| 3,739,457 | 6/1973 | Davis | 264/262 |
| 3,744,008 | 7/1973 | Castellani | 174/65 SS |
| 3,913,956 | 10/1975 | Eidelberg et al. | 174/65 SS |
| 4,015,329 | 4/1977 | Hutchison | 174/76 |

FOREIGN PATENT DOCUMENTS

| | | | |
|---|---|---|---|
| 1020577 | 2/1966 | United Kingdom | 174/65 SS |
| 1524683 | 9/1978 | United Kingdom . | |
| 1524684 | 9/1978 | United Kingdom . | |
| 1528347 | 10/1978 | United Kingdom . | |
| 1528348 | 10/1978 | United Kingdom . | |

*Primary Examiner*—W. E. Hoag
*Attorney, Agent, or Firm*—Buell, Blenko, Ziesenheim & Beck

[57] ABSTRACT

A conduit end is sealed around one or more than one insulated conductor by using a chamber (4) having a peripheral wall, a base with an opening through it communicating with the conduit (2) and an opening opposite the base. The conductor(s) (3) extend through both openings; a pre-formed annular body of a setting resin composition (8) is inserted while in a pasty or viscous condition into the chamber to encircle the conductor or conductors. Axial pressure is then applied to the still pasty or viscous annular body to cause it to flow and form a sealing body in peripherally continuous contact with the chamber and with the, or each, insulated conductor, after which the resin composition sets. A kit for use in the method is also claimed.

9 Claims, 9 Drawing Figures

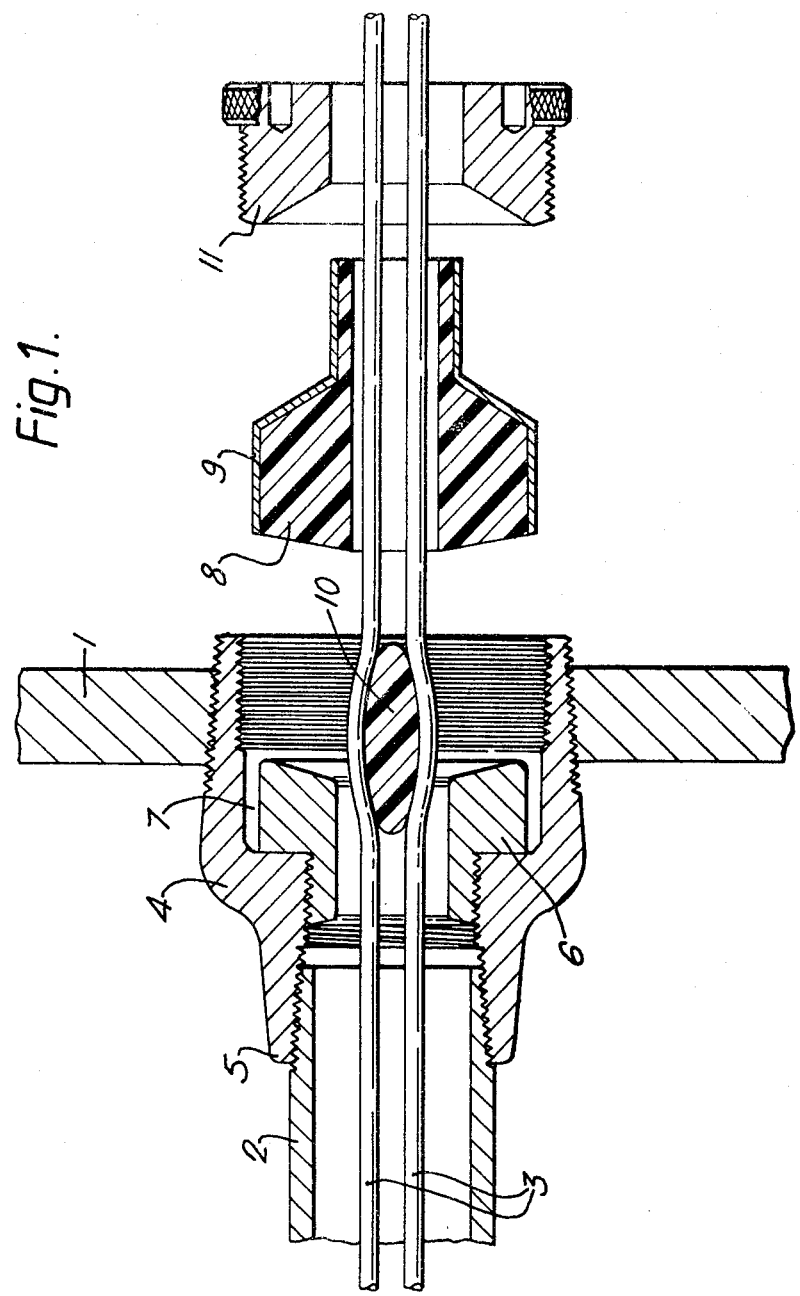

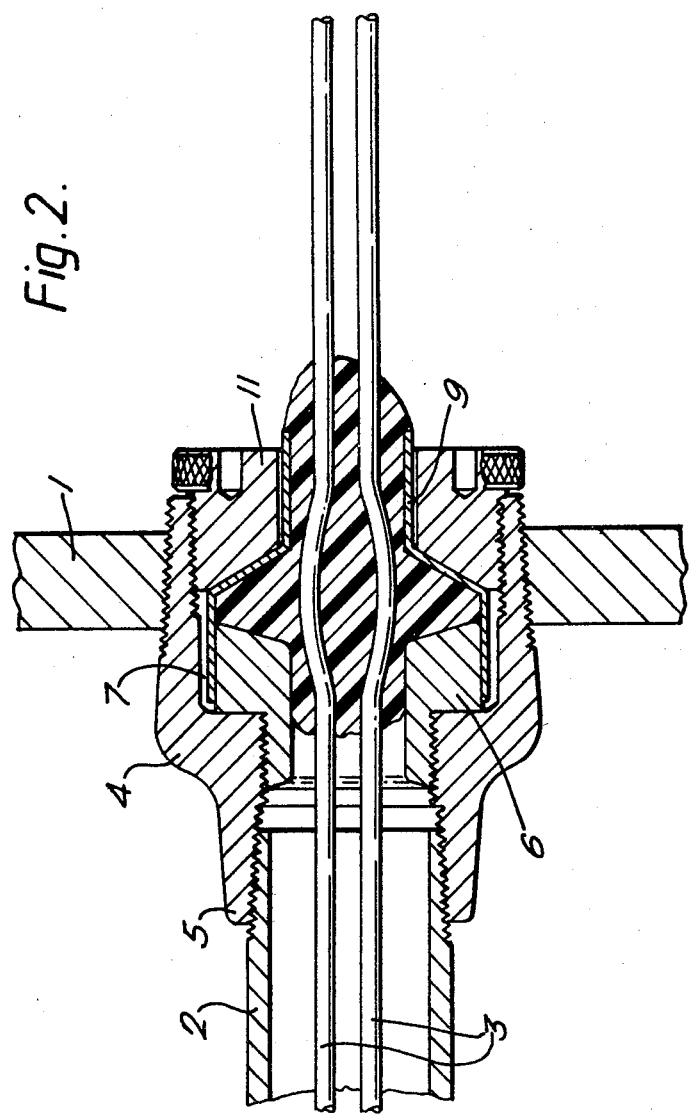

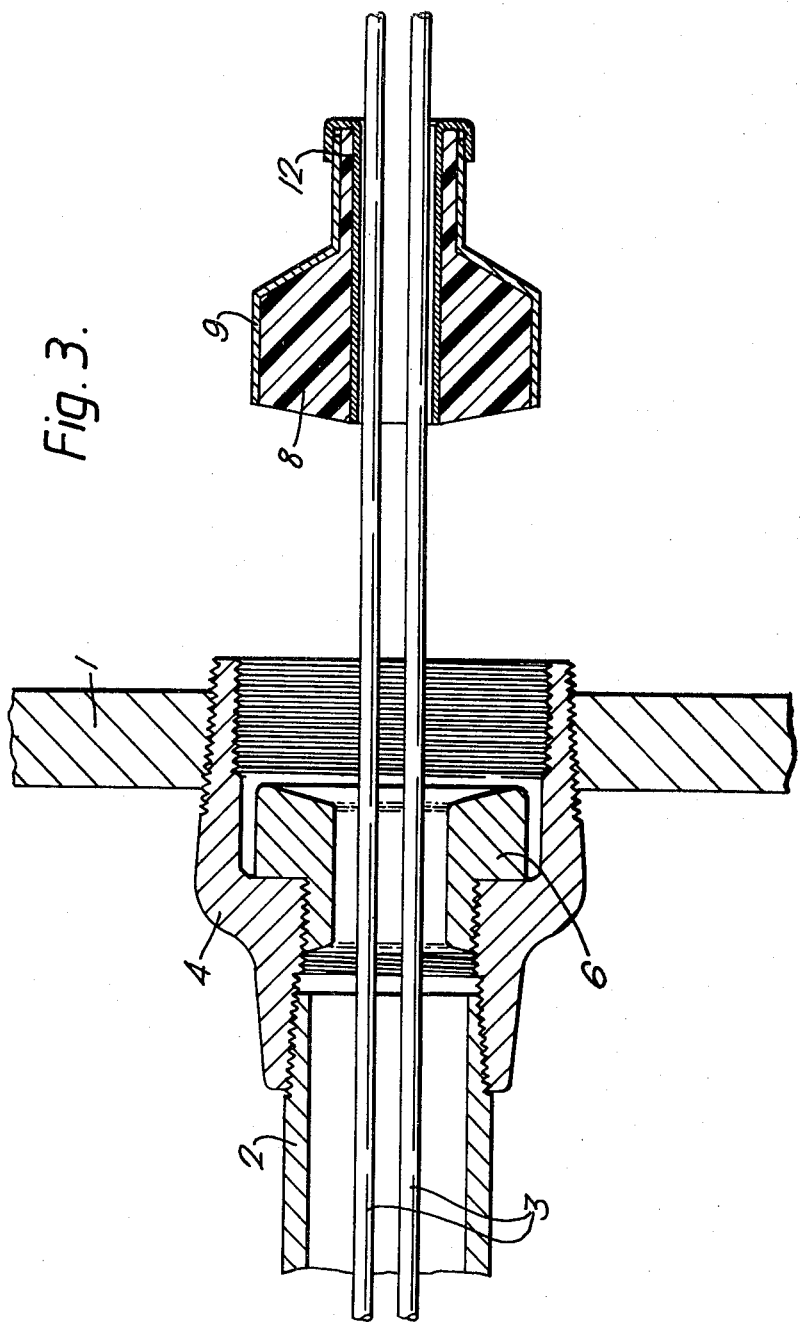

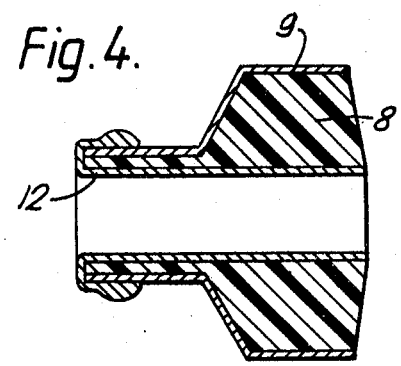
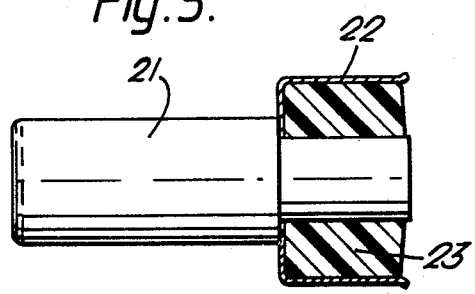
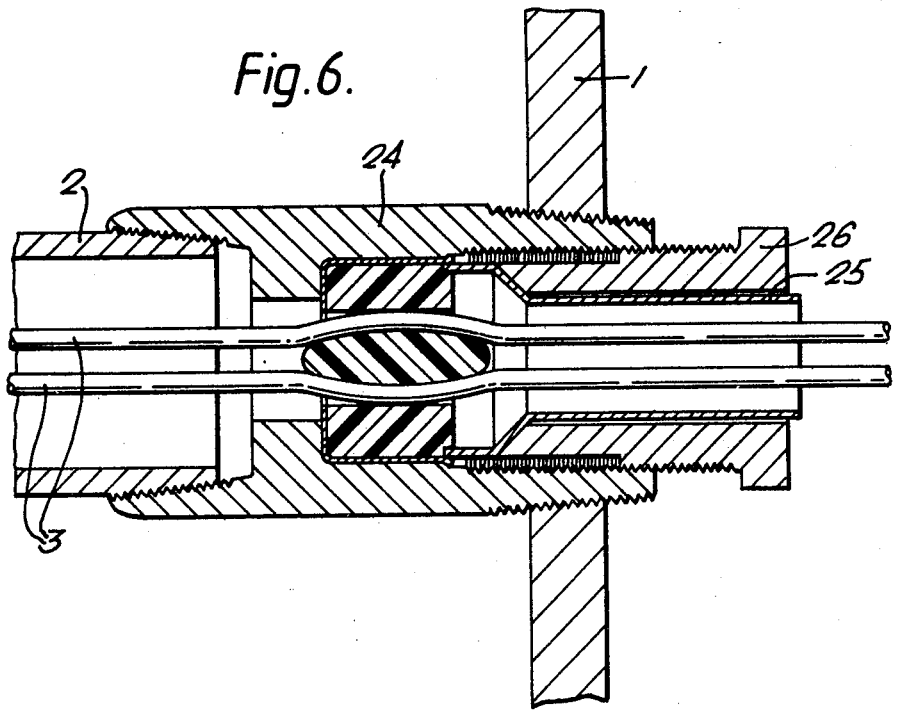

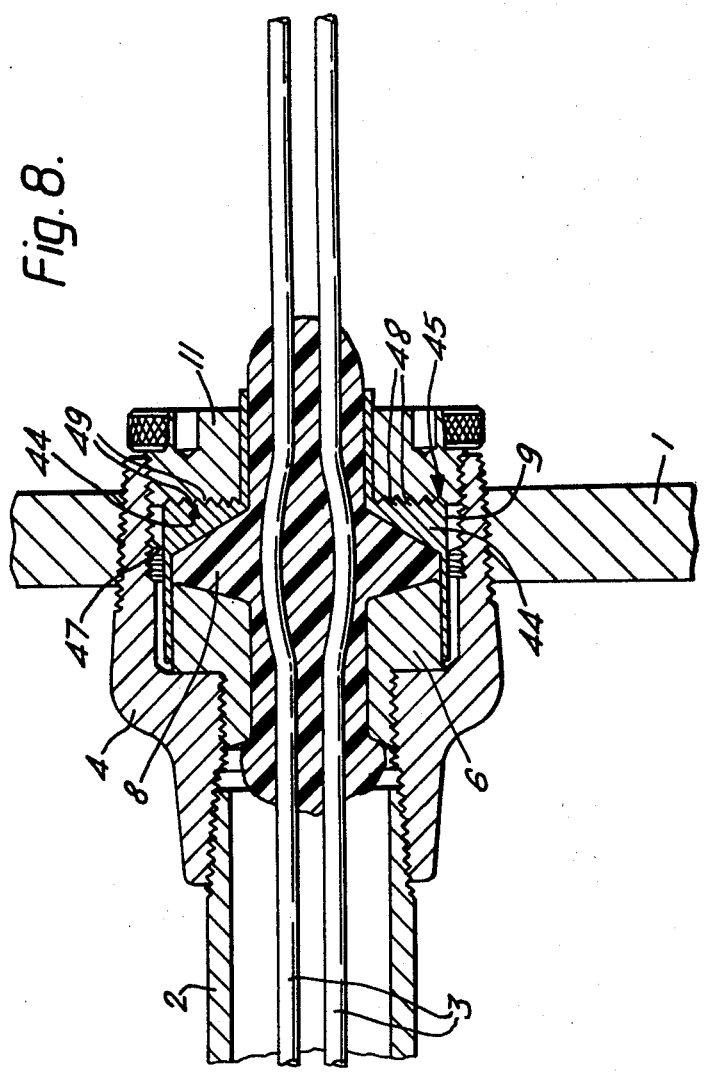

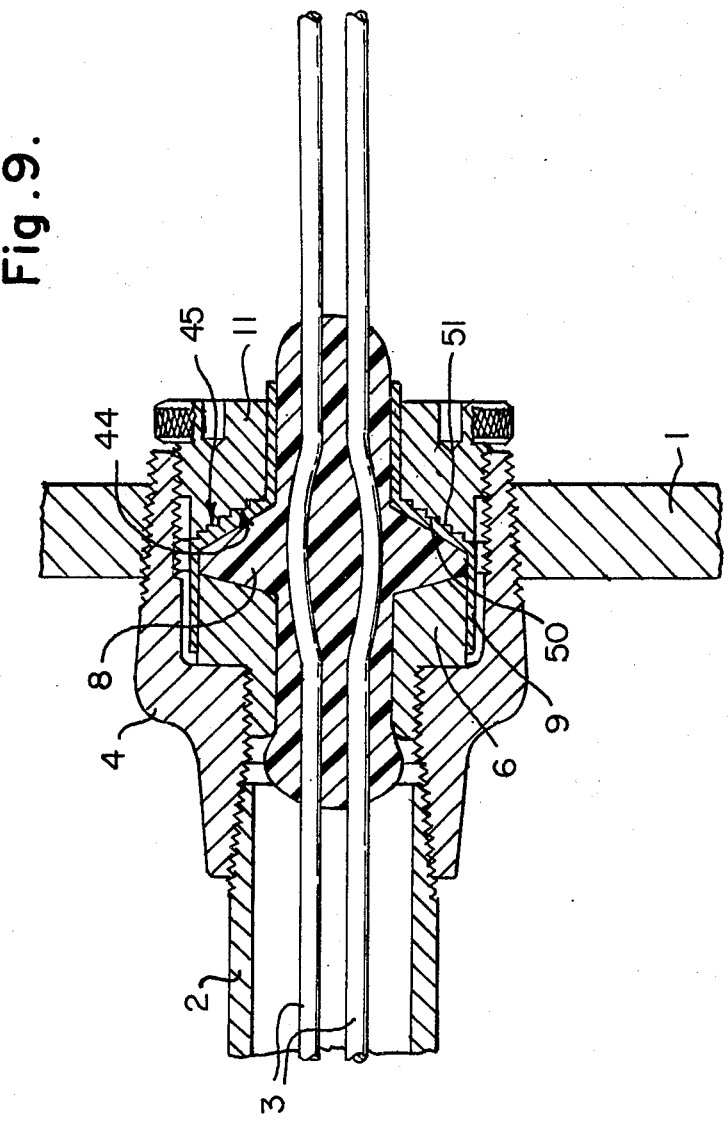

SEALING CONDUITS

This invention relates to the sealing of the ends of conduits through which electric conductors pass, more especially (though not exclusively) in flame-proof electrical equipment. By the 'end' of a conduit is meant the end of an individual conduit length and not necessarily the end of the entire run of the conduit, and by 'sealing' is meant forming a seal that is pressure-tight or flame-proof or both.

In the specification of our UK patent application (accepted) No. 1524684 we have described a method of terminating an electric cable or conduit on electrical apparatus in which (1) the cable or conduit end is prepared from an end of a surrounding protective layer of the cable or from the conduit end as the case may be;

(2) the cable or conduit is secured in a first gland member, having a passage through which the cable or conduit passes and which has an enlarged section at its forward end, with the end of the protective layer or conduit in the enlarged section;

(3) a quantity of hardenable insulating compound is applied, in a pasty or viscous condition, so as to fill and stand proud of the enlarged section of the passage in the first gland member and to adhere to the parts of the cable or conduit and conductors within it;

(4) a second gland member, having a passage with an enlarged section at its rear end, is assembled with the first gland member so as to enclose the insulating compound to an extent sufficient to allow generation of pressure in the compound;

(5) the first and second gland members are drawn together before the insulating compound has hardened so as to press the compound into firm contact with the cable; and (6) the termination is secured to the electrical apparatus by mechanically engaging at least one of the gland members;

the present invention provides a related method of and a kit for sealing a conduit end which is more convenient and more reliable when (as is usually the case) the cross-sectional area of the conduit is considerably larger than the total cross-sectional area of the insulated conductor(s).

In accordance with one aspect of the invention, a method of sealing a conduit end around one or more than one insulated conductor comprises: providing a chamber having a peripheral wall, a base with an opening through it communicating with the conduit, and an opening opposite the base, the conductor, or all the conductors, extending through both openings; preforming an annular body of a setting resin composition in a pasty or viscous condition and inserting it in that condition into the chamber to encircle the conductor or conductors; and applying axial pressure to the still pasty or viscous annular body to cause it to flow and form a sealing body in peripherally continuous contact with the chamber and with the, or each, insulated conductor; and allowing or causing the resin composition to set.

In some cases the chamber may be formed integrally with the conduit, but in most cases it will be a separte component (or an assembly of more than one component) screwed or otherwise connected to the conduit end; a flameproof screw threaded connection is usually preferred. The chamber will usually be a 'hub' that connects the conduit end to the wall of electrical apparatus.

The opening in the base of the chamber will usually have a cross-sectional area in the range from 0.4–1 times the cross-sectional area of conduit, but could be larger or (if the number and/or size of the conductor(s) in the conduit is small) smaller. In most cases a circular opening is preferred, but its shape could be varied to provide a reduced clearance around a particular group of conductors, or for other reasons, if desired. The opposite side of the chamber is preferably completely open.

When there is more than one insulated conductor, and more especially when there are more than two, it is preferable to insert an auxiliary preformed body of the resin composition between them in the chamber before applying pressure and preferably before the annular body is inserted, to facilitate sealing of interstices between the conductors.

Preferably the annular body of the resin composition is formed on a carrier that determines its form at least in part. If the carrier comprises a part that lines the bore of the annular body, which is advantageous, it will in most cases be necessary to remove at least that part of it before or during compression and in this case it, or the part to be removed, should be made of or coated with a material to which the resin composition does not adhere; preferably it is not removed until the annular body is in position in the chamber or nearly so, as the carrier than helps to avoid smearing of the resin composition. In other cases the carrier may be a permanent part of the seal.

The resin composition is preferably a resin putty, and we prefer to use an epoxy resin putty, such as that sold by the Applicant Company under the trademark BICASEAL. Putties based on acrylic, polyester and polyurethane setting resins are also suitable for most applications.

Axial pressure can conveniently be applied by a member urged into the open side of the chamber by screw action; when this member is threaded and directly screwed to the chamber wall, it preferably bears on the annular body of resin composition through an intermediate member that does not rotate with it, in order to avoid imposing rotary shearing motion on the resin composition or alternatively the member may be coated, or made of, low adhesion material. In other cases the use of an intermediate member is optional, but in some cases the use of suitably shaped intermediate members both in this position and between the resin composition and the base of the chamber may be desirable to prevent the resin adhering to the walls of the chamber and so allow the termination to be unscrewed without damaging the resin seal; in this case at least one of the intermediate members needs to be sealed to the chamber in a fluid-tight and/or flameproof manner, e.g. by a suitable sealing ring, a controlled flame gap (flameproof path) or, where practicable, a screw thread.

In one useful flame-gap arrangement, annular faces on the intermediate member and the outer member of the chamber may be so shaped that they form between them a path of tortuous configuration, such path forming all or part of the required length of the flameproof path between the members.

Preferably, the tortuous path is formed by providing on each annular surface a plurality of upstanding, spaced, concentric endless ribs defining between them a plurality of spaced, concentric endless troughs, ribs on each of said annular surfaces entering troughs in the other of said annular surfaces. In this case the annular surfaces on the tubular body and on the second annular body preferably lie in planes normal to the axis of the body, and the ribs and troughs may be tightly engaged or slightly spaced apart.

The ribs of each annular surface and the troughs on the other annular surface in which the ribs enter may be of any convenient cross-sectional shape and size, but, preferably, each rib and inter-engaging trough is of substantially triangular cross-section. Other cross-sectional shapes which the ribs and troughs may take include rectangular and sinusoidal. Preferably, all ribs on both annular surfaces are of substantially the same cross-sectional shape and size as one another.

In one alternative arrangement, the tortuous path is formed by making each annular surface of a stepped configuration comprising a plurality of spaced, concentric endless steps. For ease of manufacture, preferably the circumferential surface defining each step is parallel to the axis of the body and the annular surface defining each step lies in a plane normal to the axis of the body. The step surfaces may tightly engae one another or be slightly spaced apart.

Preferably pressure continues to be applied until the resinous compound extrudes from the chamber through one or both of the openings around the insulated conductor(s).

The invention includes a kit for sealing a conduit end around one or more than one insulated conductor comprising: a chamber having a peripheral wall, a base with an opening through it for communicating with the conduit and/or an opening opposite the base; a supply of a setting resin compound; a carrier for holding a preformed annular body of the compound in a pasty or viscous condition during insertion into the chamber; and means for applying pressure to the annular body when in the chamber to cause the flow and to produce a sealing body in peripherally continuous contact with the chamber and with the, or each, insulated conductor.

The invention also includes an electrical installation including a seal made by the method or by means of the kit described.

In order that the invention may more readily be understood, a description is given, by way of example only, reference being made to the accompanying drawings, in which:

FIGS. 1 and 2 are sectional views illustrating two stages of a method in accordance with the present invention;

FIG. 3 is a view illustrating a stage similar to that of FIG. 1 of another form of the invention;

FIG. 4 shows an alternative carrier for use in the present invention;

FIGS. 5-7 show three successive stages in a third method in accordance with the invention;

FIG. 8 shows another form of the invention; and

FIG. 9 shows another form of the invention.

Figure 7:
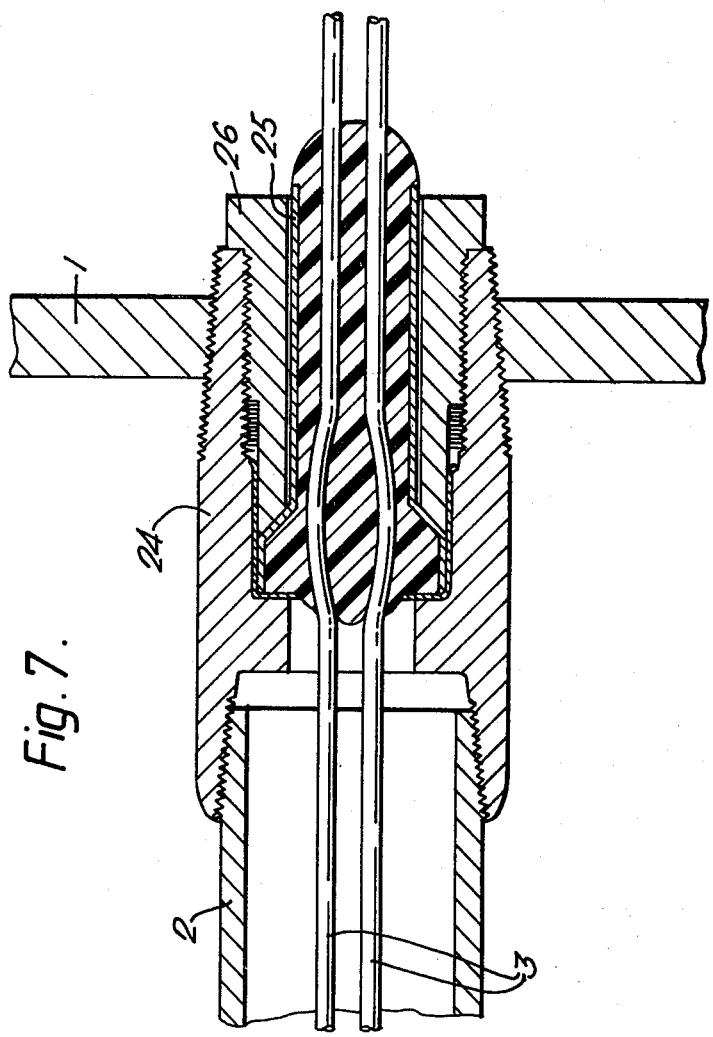

In the illustrated forms of the present invention, flameproof sealing connection is effected between a wall 1 of electric apparatus and a conduit 2, which contains two (or more) electric conductors 3 having a combined cross-sectional area considerably smaller than that of conduit 2.

In the method illustrated by FIGS. 1 and 2 a cylindrical hub 4 is screwed into the wall and has a base 5 into which is screwed conduit 2, both screw threads being flameproof. The conductors are inserted either before or after these parts are screwed together. An annular element 6 is screwed in a flameproof manner inside the hub 4, and an annular gap 7 is formed around it. A suitable quantity of BICASEAL resin putty is mixed and preformed into an annular body 8 in a carrier 9 having an open-ended frusto-conical shell; a pellet 10 of the same resin putty is placed between the conductors 3 in order to help fill any interstices between them and reduce the risk that the conductors 3 will so engage one another as to exclude the resin composition from an area between them. Carrier 9 is then inserted within hub 4 and is urged towards element 6 by screwing cap 11 into the open end of hub 4. The resin forming body 8 is compressed between the annular element 6 and the carrier 9 and flows radially inwardly to fill space between element 6, carrier 9 and the conductors 3. Eventually the resin is extruded from the hub 4 as shown in FIG. 2 in order to give visual evidence of an effective seal.

If it were desired to provide for the termination formed between conduit 2 and wall 1 to be unscrewed without damaging the resin seal and afterwards reassembled, the element 6 would need to be secured without directly screwing it in the hub 4, e.g. by using an annular threaded securing ring; the carrier 9 and element 6 could still be made of a material to which the resin adheres.

In the modified method illustrated in FIGS. 3 and 4, a mandrel 12 is inserted in the carrier 9 before resin is placed in the carrier; this simplifies shaping of the resin and protects the resin the body from loss of material through contact with the conductors as carrier 9 is brought into position. Mandrel 12 is coated with a silicone release agent to prevent resin from adhering and once carrier 9 is located in hub 4, the mandrel is removed, after which the same procedure is followed as in the method FIGS. 1 and 2.

In the alternative method of FIGS. 5-7, a cup-like carrier 22 is temporarily assembled with a stepped circular mandrel 21 (coated with silicone release agent), filled with prepared setting resin compound 23, and removed from the mandrel. The carrier, with the annular resin body so formed, is carefully inserted into the base of hub 24. The carrier prevents adhesion of the resin to the hub and so no member equivalent to the element 6 in FIGS. 1-4 is needed; a ferrule 25 prevents the resin from adhering to the cap 26. The procedure is otherwise the same as in the other methods described. The thread connecting the cap 26 to the hub 24 may need to be longer than the corresponding thread in FIGS. 1-4 if full flameproof requirements are to be met.

When a seal that is flameproof but not pressure-tight is required, a continuous open flame gap can be ensured by providing ribs or other spacers on either or both of the intermediate member and the outer member of the chamber at an appropriate position or positions along the length of the flame gap.

FIG. 8 illustrates a termination in accordance with the invention in which the chamber includes an outer member comprising the components 4 and 11 and an inner member comprising the components 6 and 9, all as in FIGS. 1 and 2 except that, to increase the length of the path between the intermediate and outer members, the members 9 and 11 have annular faces 44 and 45 respectively formed with ribs 48 and 49 that interfit to form a tortuous path between them.

FIG. 9 is similar to FIG. 8 except faces 44 and 45 are provided with special concentric endless steps 50 and 51.

What I claim as my invention is:

1. A kit for sealing a conduit end around at least one insulated conductor comprising: a chamber having a peripheral wall, a base with an opening through it for communicating with said conduit and an opening opposite said base; a supply of a setting resin compound; a carrier for holding a preformed annular body of the compound, in a condition capable of but offering resistance to flow, during insertion into said chamber: and means for applying pressure to said annular body when in said chamber to cause it to flow and to produce a sealing body in peripherally continuous contact with said chamber and with said at least one insulated conductor.

2. A method of sealing a conduit end around a plurality of insulated conductors comprising: providing a chamber having a peripheral wall, a base with an opening through it communicating with said conduit, and an opening opposite said base, said conductors extending through both openings; inserting a pellet of a setting resin composition, in a condition capable of but offering resistance to flow, between the conductors in the chamber; preforming an annular body of a setting resin composition, in a condition capable of but offering resistance to flow, and inserting it in that condition into said chamber to encircle said conductors; and applying axial pressure to said annular body while still in said condition to cause it to flow and form a sealing body in peripherally continuous contact with said chamber and with each of said insulated conductors; and the resin composition thereafter setting.

3. A method according to claim 2, wherein said pellet is inserted in said chamber before said preformed body.

4. A method according to any claim 2 or claim 3, wherein said annular body is formed utilising a carrier prior to insertion of said body into said chamber.

5. A method according to claim 2 or claim 3 wherein said annular body is formed utilising a carrier comprising a part lining the bore of said annular body and said part of the carrier is removed before the end of the application of axial pressure.

6. A method according to claim 2 or claim 3 wherein axial pressure is applied until the resin composition is extruded from the chamber.

7. A method as claimed in claim 2 in which said chamber includes an intermediate member which said resin contacts and an outer member in flameproof engagement with said intermediate member and in which annular faces on said intermediate member and said outer member are so shaped that they form between them a path of tortuous configuration, such path forming all or part of the length necessary to define a flameproof path between said intermediate member and said outer member.

8. A method as claimed in claim 7 in which said tortuous path is formed by a plurality of upstanding, spaced, concentric endless ribs on each said annular surface defining between them a plurality of spaced, concentric endless troughs, ribs on each of said annular surfaces entering troughs in the other of said annular surfaces.

9. A method as claimed in claim 7 in which the tortuous path is formed by making each annular surface of a stepped configuration comprising a plurality of spaced, concentric endless steps.

* * * * *

UNITED STATES PATENT AND TRADEMARK OFFICE
CERTIFICATE OF CORRECTION

PATENT NO. : 4,301,325
DATED : November 17, 1981
INVENTOR(S) : JOHN B. HUTCHISON It is certified that error appears in the above–identified patent and that said Letters Patent are hereby corrected as shown below:

Column 1, line 16, after "prepared", the following should be inserted:   --with the individual conductors projecting forwardly--.

Column 3, line 22, "engae" should be --engage--.

Column 4, line 30, after "resin", "the" should be deleted.

Column 4, line 36, after "method", --of-- should be inserted.

Signed and Sealed this

First Day of June 1982

[SEAL]

*Attest:*

*Attesting Officer*

GERALD J. MOSSINGHOFF

*Commissioner of Patents and Trademarks*